United States Patent
Mary et al.

(10) Patent No.: US 12,354,592 B2
(45) Date of Patent: Jul. 8, 2025

(54) METHOD AND SYSTEM FOR GENERATING AN INTELLIGENT VOICE ASSISTANT RESPONSE

(71) Applicant: Samsung Electronics Co., Ltd., Suwon-si (KR)

(72) Inventors: Shruti Mary, Noida (IN); Anupriya Tewari, Noida (IN); Shashi Singh, Noida (IN); Pankaj Tanwar, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 286 days.

(21) Appl. No.: 17/900,333

(22) Filed: Aug. 31, 2022

(65) Prior Publication Data
US 2023/0223007 A1     Jul. 13, 2023

(30) Foreign Application Priority Data
Jan. 7, 2022   (IN) ............................. 202211001059

(51) Int. Cl.
     *G10L 13/033*      (2013.01)
     *G10L 13/10*      (2013.01)
     (Continued)

(52) U.S. Cl.
     CPC .......... *G10L 13/0335* (2013.01); *G10L 13/10* (2013.01); *G10L 15/16* (2013.01); *G10L 15/22* (2013.01)

(58) Field of Classification Search
None
See application file for complete search history.

(56) References Cited

U.S. PATENT DOCUMENTS

| 8,478,826 B2 | 7/2013 | Erhart et al. |
| 10,522,143 B2 | 12/2019 | Chandrasekaran et al. |

(Continued)

FOREIGN PATENT DOCUMENTS

KR     10-2155692 B1     9/2020

OTHER PUBLICATIONS

Indian Office Action dated Aug. 9, 2024, issued in Indian Application No. 202211001059.

*Primary Examiner* — Nicole A K Schmieder
(74) *Attorney, Agent, or Firm* — Jefferson IP Law, LLP

(57) ABSTRACT

A method and a system for generating an intelligent voice assistant response are provided. The method includes receiving a preliminary voice assistant response to a user command and determining a subjective polarity score of the preliminary voice assistant response and a dynamic polarity score indicative of an instant user reaction to the preliminary voice assistant response, once the preliminary voice assistant response is delivered. The method thereafter determines a sentiment score of the preliminary voice assistant response based on the subjective polarity score and the dynamic polarity score. The method identifies an emotionally uplifting information for the user that is to be combined with the preliminary voice assistant response. The method further includes generating a personalized note to be combined with the preliminary voice assistant response and generating the intelligent voice assistant response by combining the preliminary voice assistant response with the emotionally uplifting information and the personalized note.

10 Claims, 17 Drawing Sheets

(51) Int. Cl.
*G10L 15/16* (2006.01)
*G10L 15/22* (2006.01)

(56) References Cited

U.S. PATENT DOCUMENTS

| | | |
|---|---|---|
| 11,113,335 B2 | 9/2021 | Abe et al. |
| 2018/0366118 A1* | 12/2018 | Lovitt .................. G10L 15/063 |
| 2019/0164551 A1 | 5/2019 | Watanabe |
| 2020/0302927 A1 | 9/2020 | Andruszkiewicz et al. |
| 2021/0103635 A1 | 4/2021 | Liao et al. |
| 2021/0166691 A1 | 6/2021 | Khullar et al. |

* cited by examiner

METHOD AND SYSTEM FOR GENERATING AN INTELLIGENT VOICE ASSISTANT RESPONSE

CROSS-REFERENCE TO RELATED APPLICATION(S)

This application is based on and claims priority under 35 U.S.C. § 119(a) of an Indian patent application number 202211001059, filed on Jan. 7, 2022, in the Indian Intellectual Property Office, the disclosure of which is incorporated by reference herein in its entirety.

BACKGROUND

1. Field

The disclosure relates to a method and a system for generating an intelligent voice assistant response.

2. Description of the Related Art

Voice assistants (VA) are widely used nowadays with the increased accuracy of voice recognition in the field of VA. People prefer to give commands to a voice assistant to get answers to their questions, rather than searching for them. A lot of use cases of VA have surfaced over the time. However, a voice assistant response may affect user's emotional health if it gives a negative or sad news.

FIGS. 1A, 1B, and 2 illustrate voice assistance (VA) responses according to the related art.

Referring to FIG. 1A, the user has asked the status of amazon stocks from VA. In response, the VA provides the result, which is not good for user in a monotone, which results in panicking of the user. The VA does not consider the effect the result may have on the user before delivering the result.

Similarly, referring to FIG. 1B, the user has asked the result for GMAT exam, which he failed. The VA delivers the result in a static tone. The user gets disappointed after hearing the news. The existing VA does not take into consideration the effect this news may have on the user and delivers the result without any emotional intelligence.

Similarly, referring to FIG. 2, the VA delivers good news and bad news with same tone.

Currently, all the VA responses sound like announcements with no distinction based on the content as in an exciting or sad news with respect to a particular user. None of the available voice assistants deal with problem of sudden user sentiment change after listening to an information/news on VA device. Sometimes VA provided information can badly affect user's mental wellbeing or user's current mood. In addition, in case of good news, the VA provided information may be ineffective in uplifting the user's current mood due to the monotone in which it is delivered.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for generating an intelligent voice assistant response. The method includes receiving a preliminary voice assistant response to a user command. The method further includes determining a subjective polarity score of the preliminary voice assistant response and determining a dynamic polarity score indicative of an instant user reaction to the preliminary voice assistant response, once the preliminary voice assistant response is delivered. The method thereafter determines a sentiment score of the preliminary voice assistant response based on the subjective polarity score and the dynamic polarity score, using a first neural network. Then, the method identifies an emotionally uplifting information for the user that is to be combined with the preliminary voice assistant response. The method further includes generating a personalized note to be combined with the preliminary voice assistant response based on the sentiment score and nature of the preliminary voice assistant response, using a second neural network and generating the intelligent voice assistant response by combining the preliminary voice assistant response with the emotionally uplifting information and the personalized note.

Additional aspects will be set forth in part in the description which follows and, in part, will be apparent from the description, or may be learned by practice of the presented embodiments.

In accordance with an aspect of the disclosure, a system for generating an intelligent voice assistant response is provided. The system includes a transceiver for receiving a preliminary voice assistant response to a user command. The system further includes a subjective polarity score determination unit configured to determine a subjective polarity score of the preliminary voice assistant response. The system also includes a dynamic polarity score determination unit configured to determine a dynamic polarity score indicative of an instant user reaction to the preliminary voice assistant response, once the preliminary voice assistant response is delivered. The system further includes a sentiment score determination unit configured to determine a sentiment score of the preliminary voice assistant response based on the subjective polarity score and the dynamic polarity score, using a first neural network. The system further includes an emotionally uplifting information unit configured to identify an emotionally uplifting information for the user that is to be combined with the preliminary voice assistant response. The system furthermore includes a personalized note generation unit configured to generate a personalized note to be combined with the preliminary voice assistant response based on the sentiment score and nature of the preliminary voice assistant response, using a second neural network. The system further includes a response generation unit configured to generate the intelligent voice assistant response by combining the preliminary voice assistant response with the emotionally uplifting information and the personalized note.

Other aspects, advantages, and salient features of the disclosure will become more apparent to those skilled in the art from the following detailed description, which, taken in conjunction with the annexed drawings, discloses various embodiments of the disclosure.

BRIEF DESCRIPTION OF THE DRAWINGS

The above and other features, aspects, and advantages of certain embodiments of the disclosure will be more apparent from the following description taken in conjunction with the accompanying drawings, in which.

The same reference numerals are used to represent the same elements throughout the drawings.

Figure 1A:
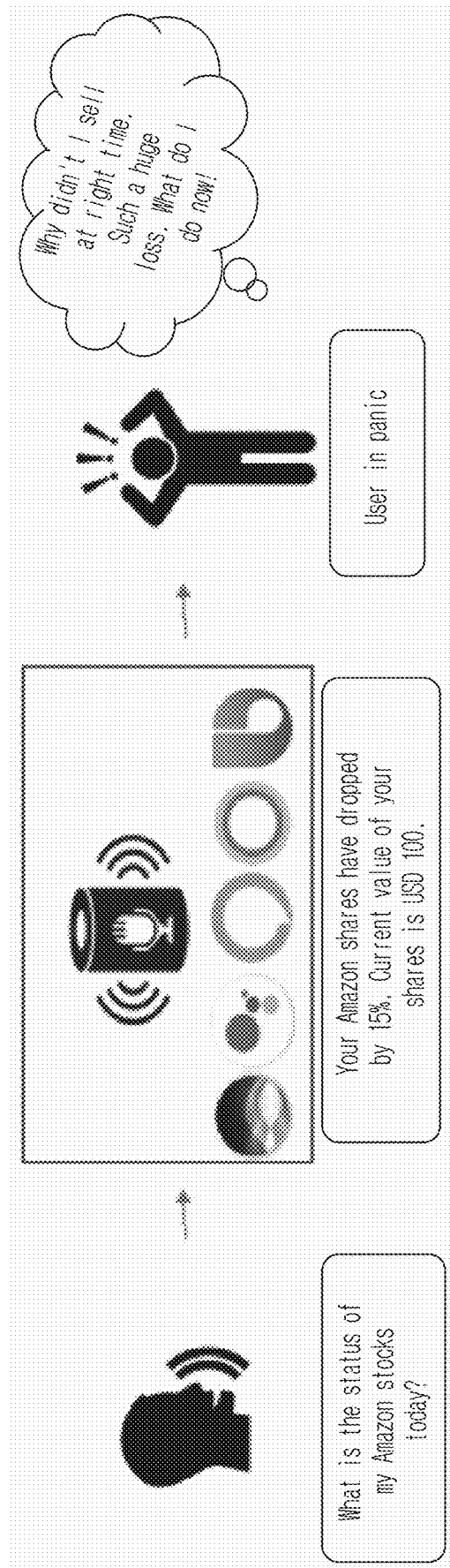
FIGS. 1A, 1B, and 2 illustrate examples of voice assistance (VA) responses, according to the related art.
Figure 1B:
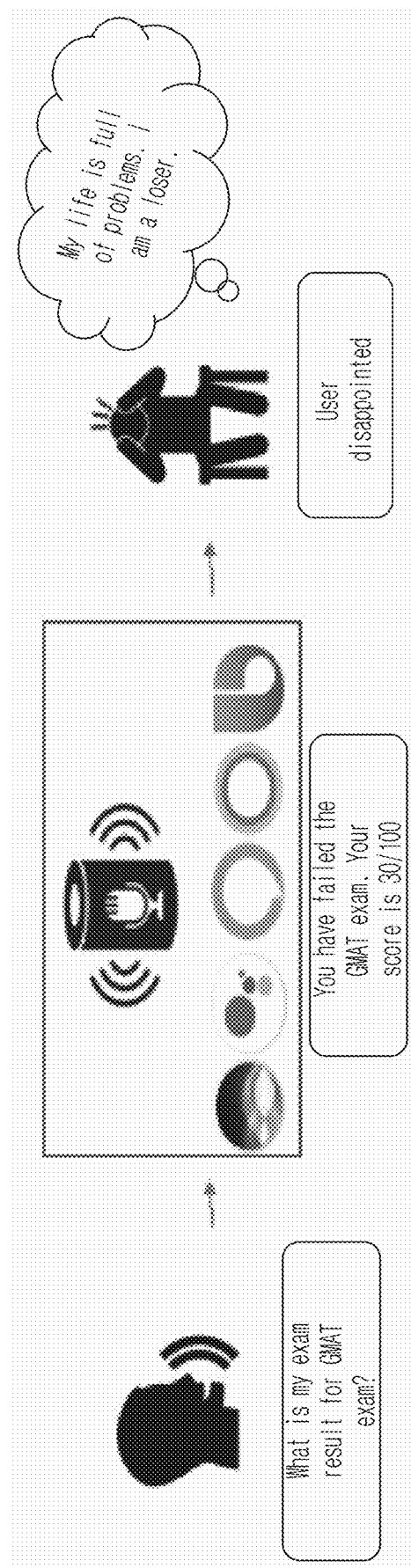
Figure 2:
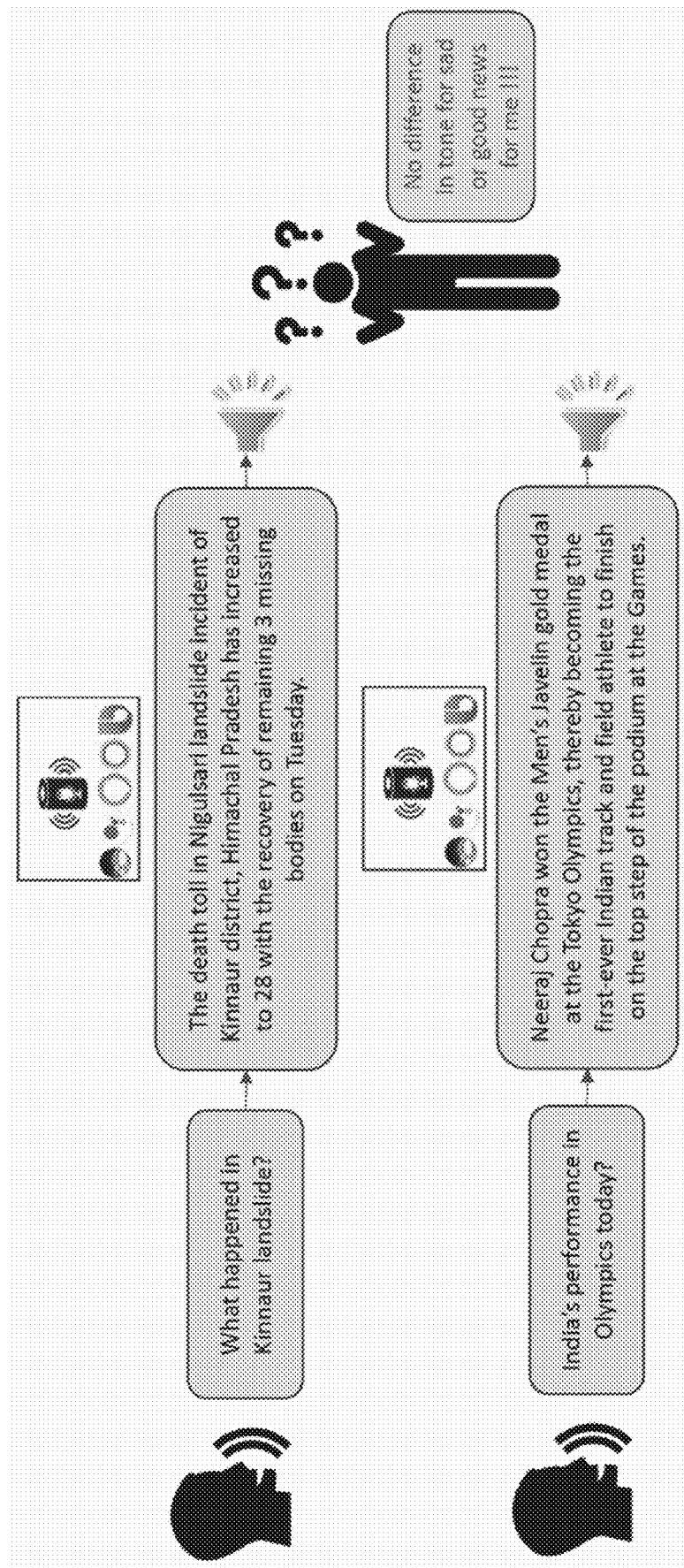

Further, skilled artisans will appreciate that elements in the drawings are illustrated for simplicity and may not have been necessarily drawn to scale. For example, the flow charts illustrate the method in terms of the most prominent operations involved to help to improve understanding of aspects of the disclosure. Furthermore, in terms of the construction of the system, one or more components of the system may have been represented in the drawings by symbols of the related art, and the drawings may show only those specific details that are pertinent to understanding the embodiments of the disclosure so as not to obscure the drawings with details that will be readily apparent to those of ordinary skill in the art having benefit of the description herein.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments."

The terminology and structure employed herein is for describing, teaching and illuminating some embodiments and their specific features and elements and does not limit, restrict or reduce the spirit and scope of the claims or their equivalents.

More specifically, any terms used herein, such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element was limited to being used only once, either way it may still be referred to as "one or more features" or "one or more elements" or "at least one feature" or "at least one element." Furthermore, the use of the terms "one or more" or "at least one" feature or element do NOT preclude there being none of that feature or element, unless otherwise specified by limiting language, such as "there NEEDS to be one or more . . . " or "one or more element is REQUIRED."

Unless otherwise defined, all terms, and especially any technical and/or scientific terms, used herein may be taken to have the same meaning as commonly understood by one having an ordinary skill in the art.

Embodiments of the disclosure will be described below in detail with reference to the accompanying drawings.

Figure 3:
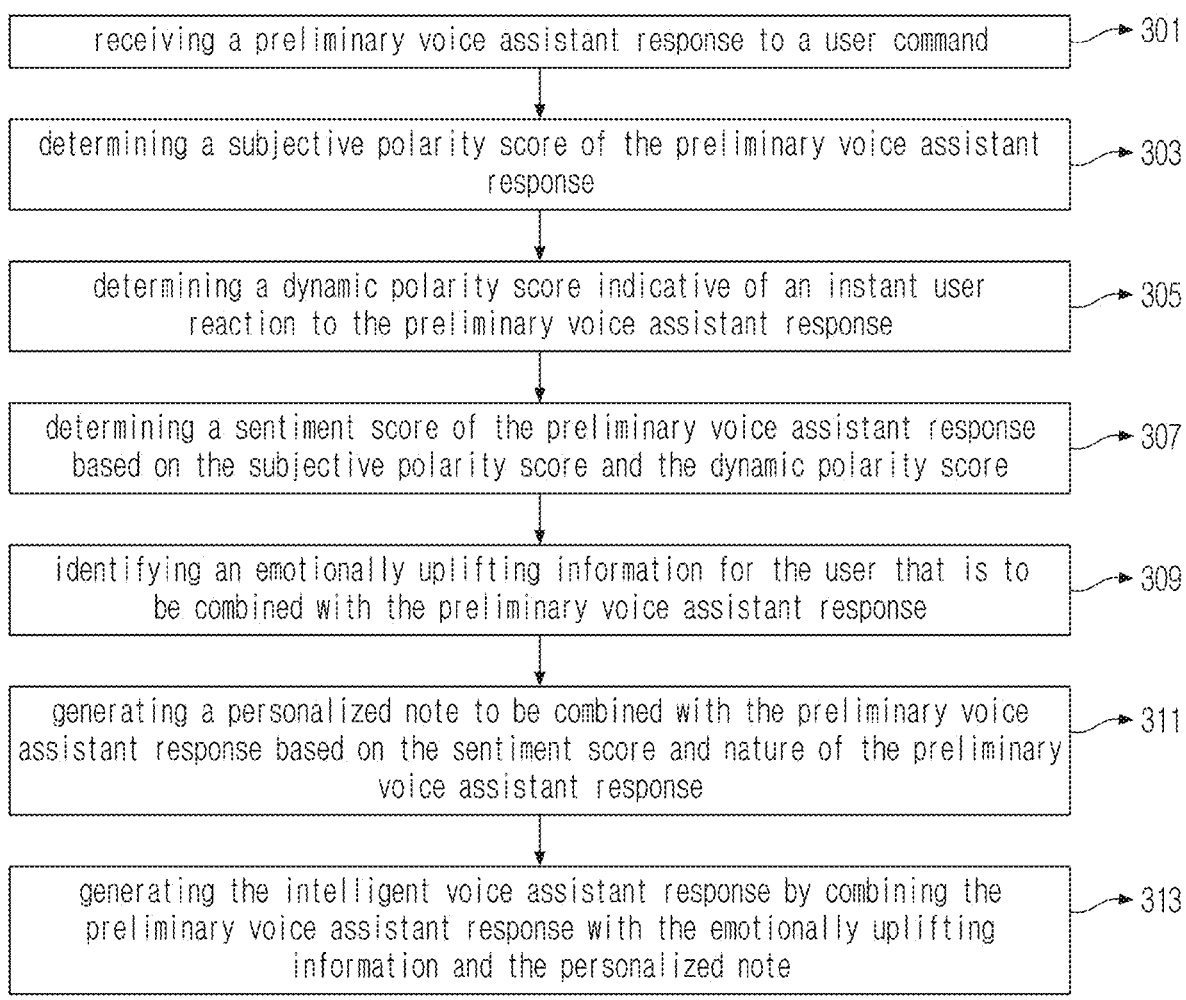
FIG. 3 illustrates a flow diagram depicting a method for generating an intelligent voice assistant response, according to an embodiment of the disclosure.

FIG. 3 illustrates method-operations according to an embodiment of the disclosure.

Referring to FIG. 3, the disclosure refers to a method for generating an intelligent voice assistant response.

Figure 4:
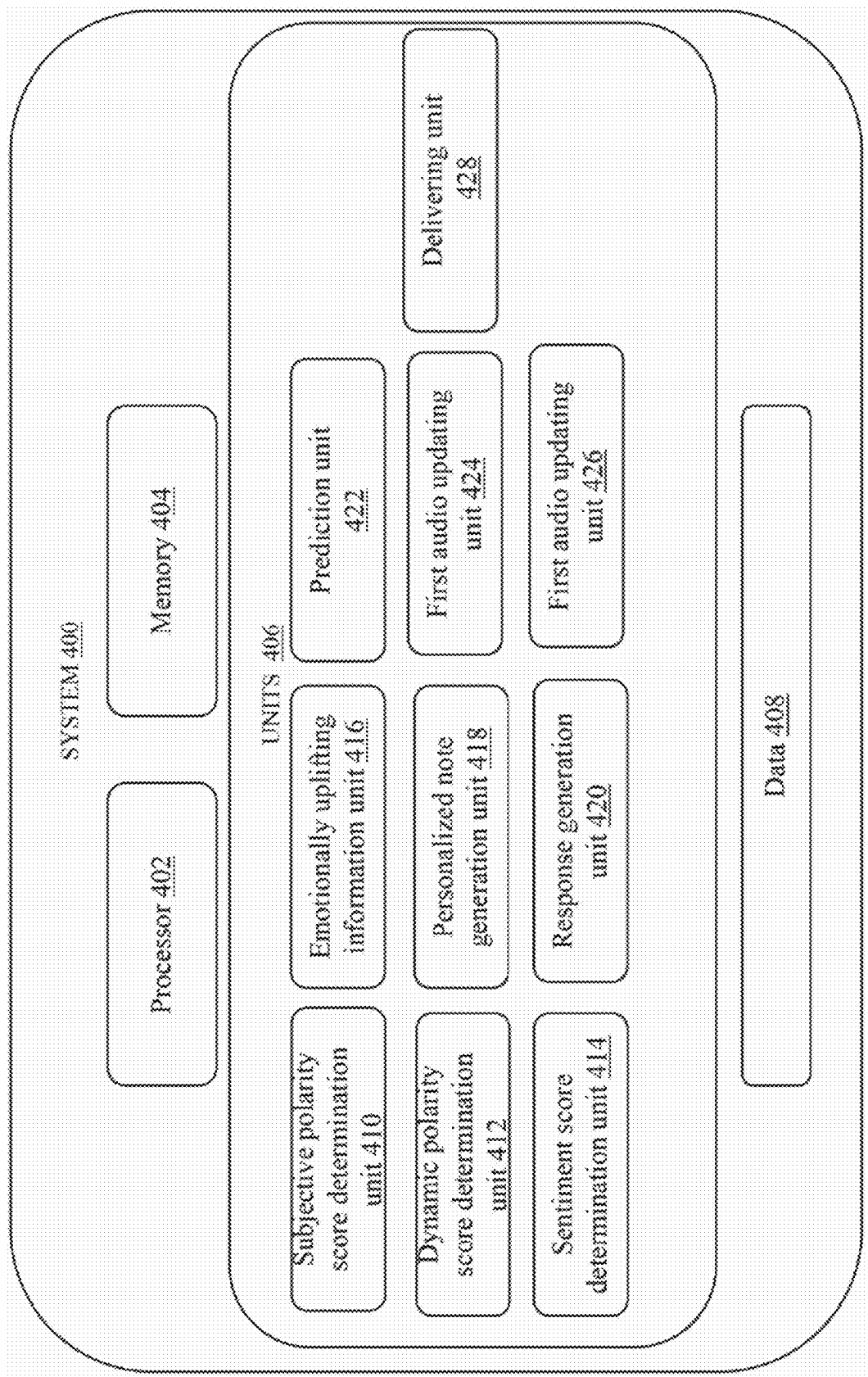
FIG. 4 illustrates a block diagram of a system for generating an intelligent voice assistant response, according to an embodiment of the disclosure.

FIG. 4 illustrates a block diagram of a system for generating an intelligent voice assistant response, according to an embodiment of the disclosure.

Referring to FIG. 4, a system 400 may include, but is not limited to, a processor 402, memory 404, units 406 and data 408. The units and the memory 404 may be coupled to the processor 402.

The processor 402 can be a single processing unit or several units, all of which could include multiple computing units. The processor 402 may be implemented as one or more microprocessors, microcomputers, microcontrollers, digital signal processors, central processing units, state machines, logic circuitries, and/or any devices that manipulate signals based on operational instructions. Among other capabilities, the processor 402 is configured to fetch and execute computer-readable instructions and data stored in the memory 404.

The memory 404 may include any non-transitory computer-readable medium known in the art including, for example, a volatile memory, such as a static random access memory (SRAM) and a dynamic random access memory (DRAM), and/or non-volatile memory, such as a read-only memory (ROM), an erasable programmable ROM, flash memories, hard disks, optical disks, and magnetic tapes.

The units 406 amongst other things, include routines, programs, objects, components, data structures, or the like, which perform particular tasks or implement data types. The units 406 may also be implemented as, signal processor(s), state machine(s), logic circuitries, and/or any other device or component that manipulate signals based on operational instructions.

Further, the units 406 can be implemented in hardware, instructions executed by a processing unit, or by a combination thereof. The processing unit can comprise a computer, a processor, such as the processor 402, a state machine, a logic array, or any other suitable devices capable of processing instructions. The processing unit can be a general-purpose processor which executes instructions to cause the general-purpose processor to perform the required tasks or, the processing unit can be dedicated to performing the required functions. In another embodiment of the disclosure, the units 406 may be machine-readable instructions (software) which, when executed by a processor/processing unit, perform any of the described functionalities.

In an embodiment of the disclosure, the units 406 may include a subjective polarity score determination unit 410, a dynamic polarity score determination unit 412, a sentiment score determination unit 414, an emotionally uplifting information unit 416, a personalized note generation unit 418, a response generation unit 420, a prediction unit 422, a first audio updating unit 424, a second audio updating unit 426 and a delivering unit 428. The various units 410-428 may be in communication with each other. The data 408 serves, amongst other things, as a repository for storing data processed, received, and generated by one or more of the units 406.

Referring to FIGS. 3 and 4, at operation 301, a method 300 comprises receiving a preliminary voice assistant response to a user command. For example, if the user has given a command to the voice assistant that "What is my exam result", the voice assistant may generate a preliminary voice assistant response, i.e., "You failed the exam Your AIR 150000". A transceiver may receive this preliminary voice assistant to further modify this response.

After receiving the preliminary voice assistant response R1, the method 300, at operation 303, may determine a subjective polarity score of the preliminary voice assistant response. In an embodiment of the disclosure, the subjective polarity score is indicative of relevance of the preliminary voice assistant response R1 to the user. The subjective polarity signifies impact of the preliminary voice assistant response R1 on the user by understanding user's feedback (likeliness/dislike) on the information in R1, through his/her interest and actions in past.

Figure 5:
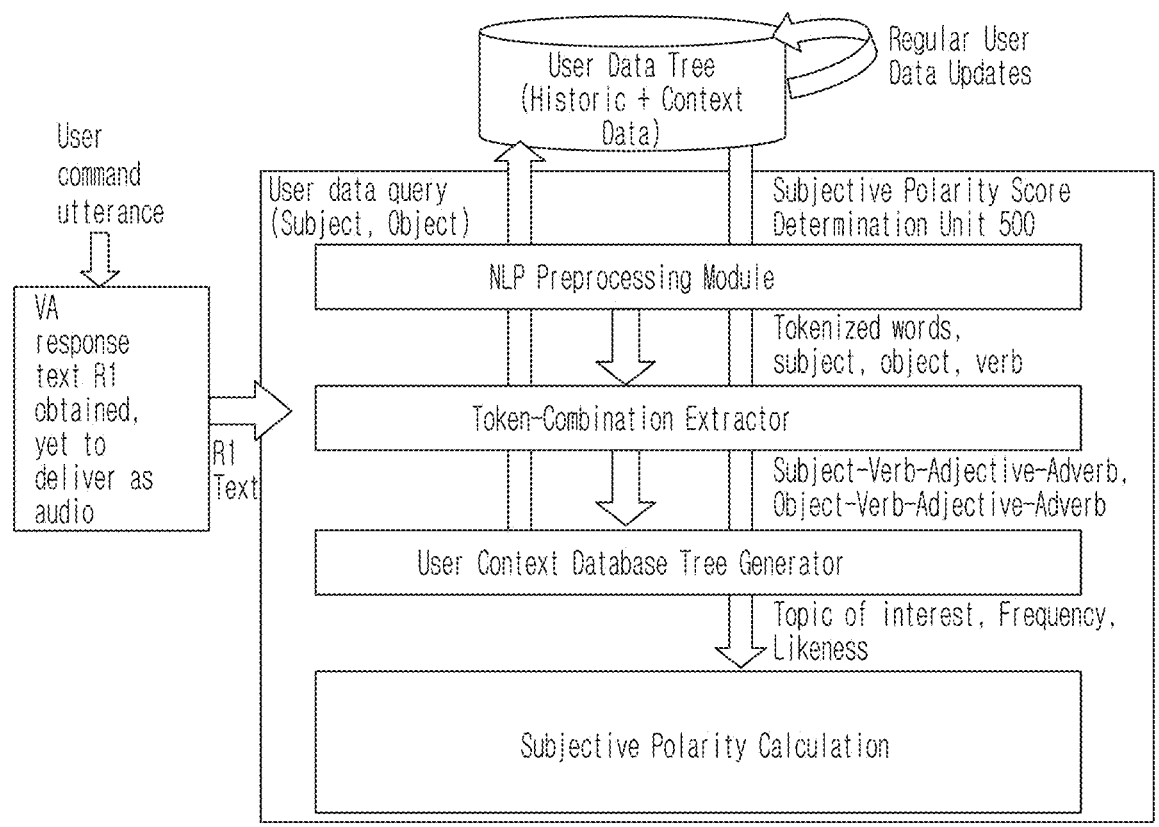
FIG. 5 illustrates a subjective polarity score determination unit of a system for determining a subjective polarity score, according to an embodiment of the disclosure.

FIG. 5 illustrates a subjective polarity score determination unit for determining the subjective polarity score, according to an embodiment of the disclosure.

Referring to FIG. 5, a subjective polarity score determination unit 500 obtains the context of the user command. To obtain the context of the user command, the user command is preprocessed by removal of stop words and then subject, object and verb, i.e., parts of speech (POS) are extracted. The POS is passed as input of the user command text to a neural network which provides context of the user command as an output. Then, the preliminary voice assistant response R1 is preprocessed similarly to obtain the POS (subject, its adverb, its adjective), and (object, its adverb, its adjective) for all the subjects and their objects in the text. Then, frequency and likeliness of the context of the preliminary voice assistant response R1 in respect of the user, is determined using a user data tree.

Figure 6A:
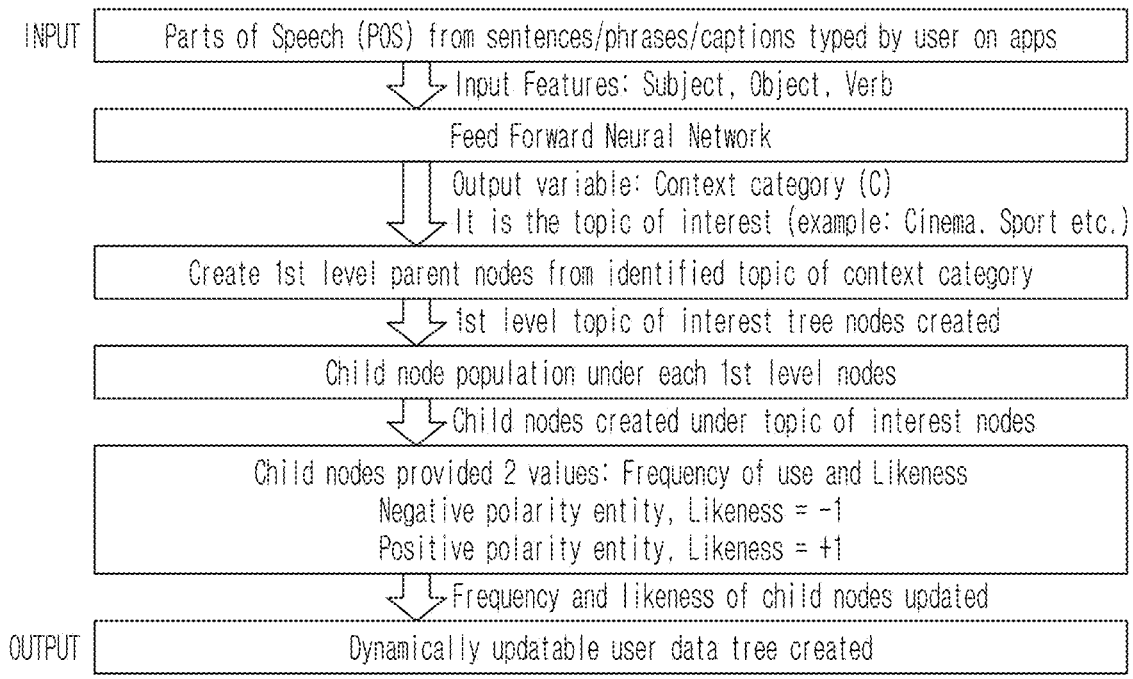
FIG. 6A shows a flow chart depicting a process of creation of user data tree, according to an embodiment of the disclosure.

FIG. 6A illustrates a process of creation of user data tree, according to an embodiment of the disclosure.

Referring to FIG. 6A, to create a user tree first, usage history of the user in the context of the preliminary voice assistant response is monitored. For example, sentences/phrases/captions typed by user on several apps like a web search engine app, along with extracted text from any post reacted (liked/disliked) on social media app are monitored. Then, using natural language processing (NLU), parts of speech (POS), i.e., subject, object and verb are extracted from the sentences and a dataset is formed with these features and the target variable having context (topic) of the sentence. Thereafter, a neural network is trained on this dataset to predict the context of the input text POS. If the predicted context is not previously observed for the user, then it becomes one of the parent node (first level of parent node) in the user data tree. The subject and object extracted from the text become the child nodes of the parent node. Each child node is assigned two parameters—frequency and likeliness. Frequency defines how many times the child element has been typed or reacted upon by the user. Likeliness (1 or −1) defines if the element was positively or negatively talked about. The likeliness may be determined by the polarity of the associated adjective or adverb to the element in the text. Below are few examples of determining likeliness in respect of a context:

User searches on internet: India best cricket team.
Polarity (best)=positive, Likeliness (India)=1 under category Cricket
User likes a criticizing tweet: England is the worst cricket team in present times.
Polarity (worst)=negative, Likeliness (England)=−1 under category Cricket The user data tree is updated periodically to understand change in user interest towards any context. The user data tree represents the topics user has engaged with affinity or dislike.

Figure 6B:
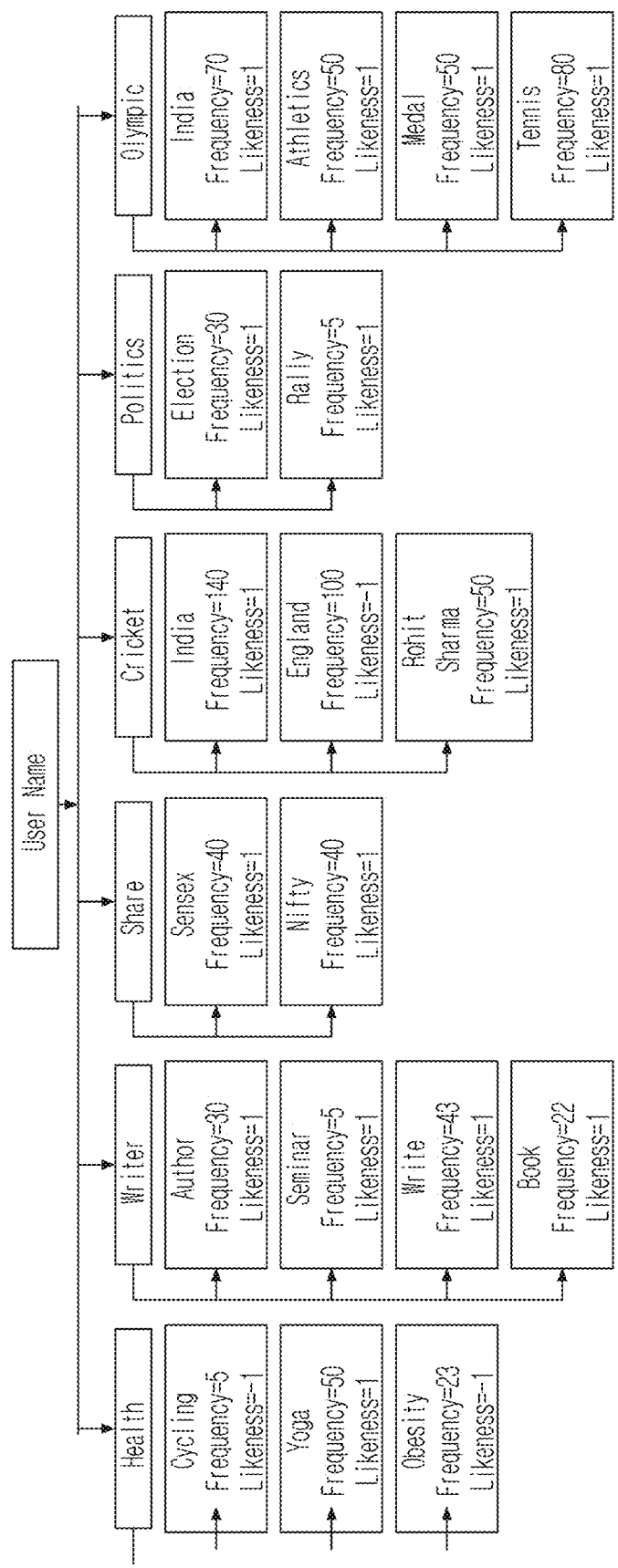
FIG. 6B shows a user data tree, according to an embodiment of the disclosure.

FIG. 6B illustrates a user data tree, according to an embodiment of the disclosure.

Referring to FIG. 6B, to determine the frequency and likeliness of the context of the preliminary voice assistant response R1 in respect of the user, the subjects and objects are to be found in the user data tree as child nodes under the context. Thereafter, all the found nodes are obtained along with their frequency and likeliness values. In other words, frequency and likeliness of the context is determined. Finally, the subjective polarity score is calculated using below formula:

Subjective Polarity Score=SPS=Polarity of EU*{FEU/Summation (F of all children nodes of positive likeliness under C)}
where, F=Frequency, L=Likeness, Predicted Context Category=C, Entity of user interest=EU (Entity with Max(F*L) value)

However, if subject and object are both not found in the tree, it signifies that user command is on a new context or topic which has not been previously observed for this user. The subjective polarity score is 0 in this case. The new context parent node and its children nodes are added to the tree. "FEU/Summation (F of all children nodes of positive likeness under C)" denotes importance of concerned entity among all the entities liked by the user under a topic.

Below is an example to determine the subjective polarity score:

User Command: What is the result of India versus England cricket match?

Preliminary VA response R1: England beat India by 3 wickets.
Context=Cricket
Subject—England,
Object—India,
Verb—Beat
From user data tree:
England (Frequency F1, Likeness L1)=(100, −1)
India (Frequency F2, Likeness L2)=(140, 1)
From Global Polarity Database: Beat=Negative
EU=Max(F*L); gives Max(−100, 140): EU=India
Polarity of EU=Polarity of adjective/adverb/verb=Negative=−1
Subjective Polarity Score=−1*(140/(140+50))=−0.73

It is to be noted that, with general polarity definition, R1 response will be thought as positive with England as the subject. But for an Indian fan, it is negative.

After determining the subjective polarity score, at operation 305, the method 300 comprises determining a dynamic polarity score indicative of an instant user reaction to the preliminary voice assistant response, once the preliminary voice assistant response is delivered. In particular, before generating the intelligent voice assistant response, the preliminary voice assistant response R1 is delivered to the user and instant user reaction to R1 is identified to determine the dynamic polarity score. In an embodiment of the disclosure, the dynamic polarity score may be determined by analyzing at least one of instant audio response and instant body reaction of the user to R1. The dynamic polarity score may also be determined by determining presence of another user in proximity of the user at the time of delivering R1.

Figure 7:
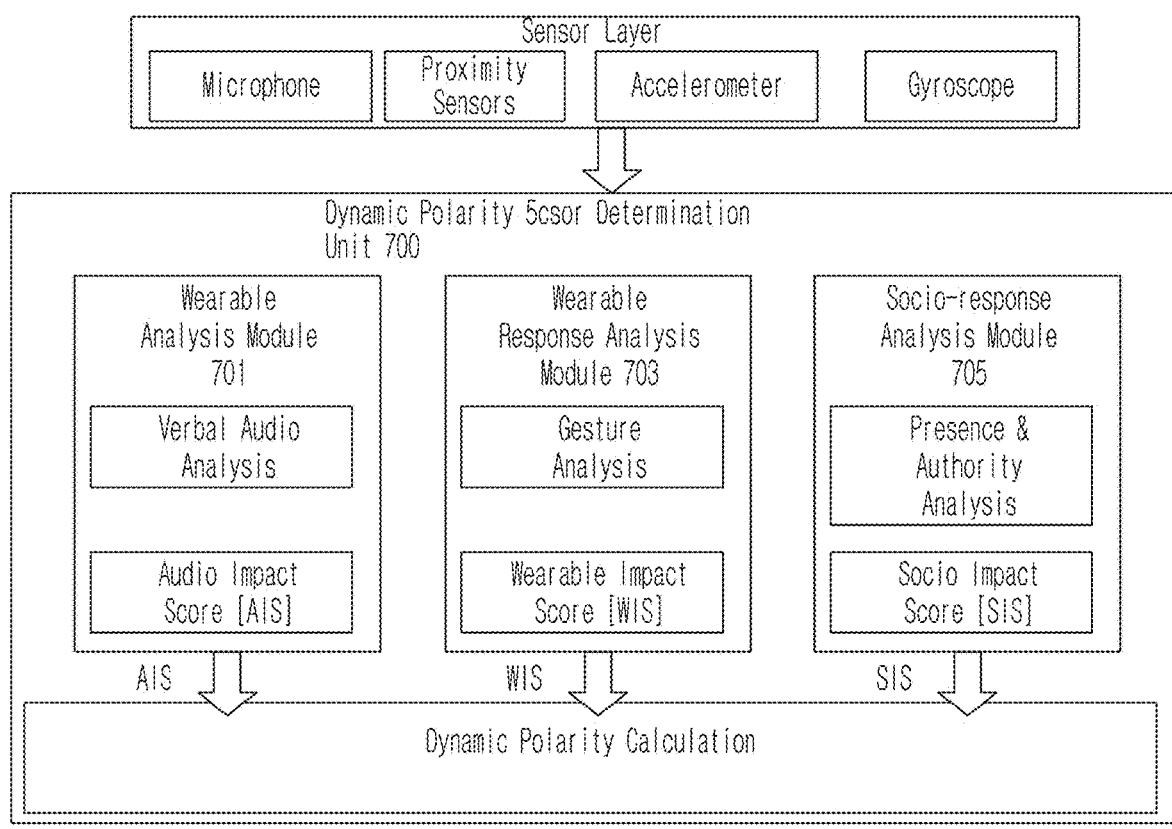
FIG. 7 illustrates a dynamic polarity score determination unit of the system for determining a dynamic polarity score, according to an embodiment of the disclosure.

FIG. 7 illustrates a dynamic polarity score determination unit for determining the dynamic polarity score, according to an embodiment of the disclosure.

Referring to FIG. 7, a dynamic polarity score determination unit 700 may comprise of an audio response analysis module 701, a wearable response analysis module 703 and a socio-response analysis module 705 and all these three units are connected to a sensor layer comprising of a microphone, proximity sensor, accelerometer, gyroscope, or the like.

In an embodiment of the disclosure, the audio response analysis module 701 may analyze the instant audio response (AIS) by capturing user audio by nearby microphone in the user device, VA or any other IoT device. How much the user speaks, and with what polarity of words helps to obtain the impact of response R1. For example, some verbal reactions to analyze the audio response may be 'Oh no!', 'Yes', 'I made it happen', 'Time to party again', 'Not again', 'My life sucks'.

In an embodiment of the disclosure, the wearable response analysis module 703 may analyze the instant body reaction (WIS) by recognizing any hand gestures made by the user through wearable device, such as smart watch. Each gesture is assigned a polarity and how strongly it was made, helps to obtain the impact of response R1. For example, gestures, such as hand wave, first wave may be considered positive, whereas gestures, such as face palming, first bang may be considered negative.

In an embodiment of the disclosure, socio-response analysis module 705 may determine presence of another user (SIS) in proximity of the user by identifying any surrounding members near the user to listen to the response R1. People presence may be detected through their smartphone communication with nearby IoT devices and their names may be identified through synced accounts in their phones. Each category of person may be assigned an authority level, and the category is known by their relationship with user obtained through presence of a person name's in the named groups in user's app like Contacts. The number of people around with the least authority will affect the user the most, and that is used for obtaining impact of response R1. Hence, if the user is surrounded by people with less authority, the user may not want to listen to the response in a louder tone. Hence, the presence of other people near the user may have an effect on the user while listening to the response to its command. For example, the authority level may be friends, family, colleagues, others, or the like. Now, if the person(s) surrounding the user belongs to an authority level of family then the user may expect the response in a high tone when news is positive. On the other hand, if the person(s) surrounding the user belongs to an authority level of other then the user may expect the response in a moderate tone when news is positive.

Then, the dynamic polarity score determination unit 700 may determine the dynamic polarity score as:

$$\text{Dynamic Polarity Score}=\text{Sigmoid}(AIS+WIS+SIS)$$

The dynamic polarity score may range from −1 to 1, where −1 being Negative and 1 being Positive.

Below is an example of determining the dynamic polarity score based on above discussed parameters:

Audio Response Analysis: "Not again."

$$AIS=\text{polarity}*\text{no. of words}=-1*2=-2$$

Wearable Response Analysis: Detected—Despair (User throws hands to head).

$$WIS=\text{Polarity}*\text{hand acceleration}=-1*1=-1$$

Socio-response Analysis: Nearby identified people: Sam (Friend).

$$SIS=\text{Minimum authority}*\text{No. of people}=1.5*1=1.5$$

$$\text{Dynamic Polarity Score}=\text{sigmoid}((-2)+(-1)+(1.5))=-1$$

After determining the dynamic polarity score, the method 300 comprises, at operation 307, determining a sentiment score of the preliminary voice assistant response based on the subjective polarity score and the dynamic polarity score, using a first neural network. In an embodiment of the disclosure, the sentiment score is indicative of an emotional quotient to be incorporated in the intelligent voice assistance response to the user. In an embodiment of the disclosure, in order to determine the sentiment score, stop-word free text sequence is extracted from preliminary voice assistant response R1 and is passed to word embedding layer. Word embedding (word vectors) are learned from data and essentially are low-dimensional floating-point vectors that pack information in few dimensions. Thereafter, the word embedding output is followed by a sequential input taking neural network layer like Bi-directional long-short term memory (LSTM) layer. The output from this layer is taken as a feature and is concatenated with the subjective polarity score feature and dynamic polarity score feature creating the first neural network to obtain the sentiment score. In an embodiment of the disclosure, the first neural network maybe a functional machine learning model comprising the above features. The first neural network may be trained on a large text corpus created from sentences and phrases obtained from news headlines across core sectors like—health, career, finance, sports, climate, politics, or the like. The target emotion will be provided for training. In an embodiment of the disclosure, 'A Million News Headlines' dataset is used as text corpus. It should be noted that any other dataset may be used as text corpus. The range of the sentiment score may vary from 0 to 1. In an embodiment of the disclosure, if the sentiment score is <=0.3—then the emotion of the user may be considered as negative. If the sentiment score is >0.3 & <0.6, then the emotion of the user may be considered as neutral. However, if the sentiment score is >=0.6, then the emotion of the user may be considered as positive. Further, it is to be noted that if the dynamic polarity score is 0 till the preliminary voice assistant response R1 is completely delivered then the sentiment score is determined with only subjective polarity, keeping dynamic polarity score feature value in the neural network as 0 to avoid delay/lag in delivery, for consistent user experience.

After determining the sentiment score, the method 300 comprises, at operation 309, identifying an emotionally uplifting information for the user that is to be combined with the preliminary voice assistant response R1. The emotionally uplifting information R2 represents the information which needs to be added to the preliminary voice assistant response R1 to uplift the user emotion. In an embodiment of the disclosure, the emotionally uplifting information R2 is identified from the context of the preliminary voice assistant response. In particular, the emotionally uplifting information R2 may be identified using the sentiment score and the user data tree children nodes which have positive likeness value under the parent node of the context of the preliminary voice assistant response.

The emotionally uplifting information R2 is identified from a local or global database based on at least one of context of the preliminary voice assistant response R1, the sentiment score and context of the user data tree. The context of the user data tree may refer to frequency and likeliness. The local and global data sources are searched for possible relevant and emotionally uplifting information. The local data sources may be the applications installed in the user device and the global data source may be internet search. To identify the emotionally uplifting information, a number of search queries are formed which comprise of the context 'C' of the preliminary voice assistant response, user command and Ni (child of positive likeness of C in user data tree). Then, the formed queries are searched in the local database which may comprise a mapping table (Table 1) of application and the context. The formed queries are also searched in the global database. The emotionally uplifting information R2 is obtained out of the query result set, based on subjective polarity and personalized user importance (through query result metadata of Table 2). The most important query result is the most recent, most favorite and most visited (in this order), having subjective polarity greater than sentiment score of R1 (S). Accordingly, the query result having a subjective polarity score greater than the sentiment score is considered.

Table 1 shows an example of context category-application mapping database:

| Id | Context | Application List |
|---|---|---|
| 1 | Schedule | [Reminder, Calendar, Notes, Gmail] |
| 2 | Exam | [Reminder, Calendar, Notes, File Manager, Gmail] |
| 3 | Cricket | [HotStar, CrickBuzz, Calendar] |
| 4 | Birthday | [Calendar, Flipkart, Amazon] |

Table 2 shows an example of Content Metadata Extracted

| Content source | Timestamp of entry/upload/download | Marked as important/Favorite | No. of times visited |
|---|---|---|---|
| file:///mnt/sdcard/documents/warrenty.pdf | 20-09-2021 11:33 | Yes | 15 |
| ://android/app/hotstar/cricket | 18-09-2021 20:35 | No | 1 |
| /storage/emulated/0/Android/data/com.example.simone.pizzino/files/jee_result.pdf" | 18-09-202120:35 | Yes | 5 |

Below is an example of identifying emotionally uplifting information based on a user command:

User command: What is the result of India versus England cricket match?

Preliminary voice assistant Response (R1): India lost the match by 3 runs with 2 wickets remaining.

Under User Profile Tree, child nodes of Cricket with positive likeness:
   India, New Zealand, World Cup, Rohit Sharma, Dale Steyn, test, international, IPL
3 query results are filtered having subjective polarity greater than sentiment score of R1:
   q1=Rohit Sharma scored a magnificent century. (last year) [fetched from web search]
   q3=Rohit Sharma scored a magnificent century. (today) [fetched from Hotstar app]
   q5=India on position 5 in the world cup. (last month+ marked favorite) [fetched from CricBuzz]
   emotionally uplifting information R2 based on importance: q3 (based on importance)=Rohit Sharma scored a magnificent century.

After identifying the emotionally uplifting information R2, the method 300 comprises at operation 311, generating a personalized note to be combined with the preliminary voice assistant response R1 based on the sentiment score and nature of the preliminary voice assistant response R1, using a second neural network. To generate the personalized note, a dataset is created having six input features and an annotated output, as shown in Table 3.

TABLE 3

| Text sequence (R1) | Nature of Context | Context Category (C) | Relation with Info | R1 sentiment Score | Associated Activity App | Relationship with Surrounding User | Personalized note (Prediction) |
|---|---|---|---|---|---|---|---|
| Mr. John made the X party | Recognition | Politics | Public | 0.7 | Twitter | Friend | It's time to tweet again |

TABLE 3-continued

| Text sequence (R1) | Nature of Context | Context Category (C) | Relation with Info | R1 sentiment Score | Associated Activity App | Relationship with Surrounding User | Personalized note (Prediction) |
|---|---|---|---|---|---|---|---|
| chairman. | | | | | | | |
| England beat Australia by 5 runs. | Information | Cricket | Public | 0.5 | Twitter | Family | It's time to tweet again |
| You have passed with 478 marks in 500. | Achievement | Career | Personal | 0.9 | None | Family | You made your family proud |
| The sugar level is very high 350. | Information | Health | Personal | 0.3 | S-health | No one nearby | Need to check S-health again |
| The sugar level is normal. | Information | Health | Personal | 0.6 | S-health | No one nearby | Good use of S-health |
| The stock price of share A dropped by drastic 200% | Loss | Finance | Personal | 0.2 | None | Family | Hard time for family but keep calm |

The second neural network which may be trained using 'A Million News Headlines' text dataset to obtain the input feature values. Further, the second neural network i.e., a feed forward neural network may be trained on the dataset to generate personalized note.

In the above Table 3, the various input features and Values are:
1. Nature of event: nature of the context of the preliminary voice assistant response
2. Context Category: context of the preliminary voice assistant response
3. Relation with Event: Relation of the event i.e., context with the user which may be marked as Personal or Public, obtained by the presence or absence of possession nouns like my, mine in the user command
4. R1 sentiment score: sentiment score of the preliminary voice assistant response
5. Associated Activity App: This defines the application which is associated with the context of the preliminary voice assistant response and used by the user. It may be obtained from a database having user app engagement marked after listening to information of a particular context. For example, a user generally tweets after asking political information.
6. Relation with nearby people: It defines relationship of the user with people in proximity of the user. The nearby people may be identified through synced accounts in the user device, such as smartphones in vicinity of the use. User's Contacts app group tag gives authority (Family/Friend/Other) of nearby people.

The nature of event i.e., context of the preliminary voice assistant response R1 or the emotionally uplifting information R2 may be determined as follows:

A dataset is created having two input features and an annotated output variable, as shown in Table 4.

TABLE 4

| Context of R1 or R2 | Verb | Object (Hypernym) | Nature of event |
|---|---|---|---|
| Mr. John assigned the X party chairmanship | Assigned | position (chairmanship) | Recognition |
| England beat Australia by 5 runs | Beat | Country (Australia) | Information |
| You have passed with 478 | Passed | Marks | Achievement |

TABLE 4-continued

| Context of R1 or R2 | Verb | Object (Hypernym) | Nature of event |
|---|---|---|---|
| marks in 500 | | | |
| The sugar level is very high 350 | Is | Glucose (sugar level) | Information |
| The sugar level is normal | Is | Glucose (sugar level) | Information |
| The stock price of share A dropped by drastic 200% | Dropped | Investment (share) | Loss |

To create the database, a text dataset 'A Million News Headlines' may be used to obtain the input features i.e., verb and Hypernym of Object. The verb is obtained from parts of speech extraction of the context of R1 or R2. Then, the hypernym of object may be obtained using Wordnet. A hypernym describes a relation between entities, and gives a generalized value to a specific event. For example, Hypernym (cancer)=disease. Then, and the input features are provided to a feed forward neural network which is trained on the dataset to predict the nature of event in the sentence among the following five categories i.e.

Achievement (positive)
Recognition (positive)
Information (neutral)
Failure (negative)
Loss (negative)

It shall be noted that the nature of event may belong to some other categories than defined above. The above five categories are an embodiment of the disclosure and may include other categories not defined above.

In an embodiment of the disclosure, the method 300 further comprises generating 313 the intelligent voice assistant response by combining the preliminary voice assistant response with the emotionally uplifting information and the personalized note.

In another embodiment of the disclosure, a connective word may be predicted before generating the intelligent voice assistant response. The connective word may be predicted using a prediction unit 422 of the system 400. The connective word may connect the personalized note with the preliminary voice assistant response. The connective word may be predicted based on the sentiment score, the nature of the preliminary voice assistant response R1, and nature of the emotionally uplifting information R2, using a third neural network. A suitable connective word between the personalized note and the preliminary voice assistant response R1 reflects the emotion change from negative towards neutral/positive, or from neutral/positive towards more positive. To predict the connective word, a dataset is created having three input features and an annotated output variable, as shown in Table 5. The input features may be obtained by predicting the nature of events of the text of the preliminary voice assistant response R1 and the emotionally uplifting response R2 from 'A Million News Headlines' dataset. Then, a third neural network i.e., feed forward neural network is trained on the dataset to predict the connective word. Table 5 shows an example of various connective words based on nature of events of R1, R2 and sentiment score of R1:

TABLE 5

| Nature of event of R1 | Nature of event of R2 | Sentiment score of R1 | Connective word |
| --- | --- | --- | --- |
| loss | information | 0.4 | nevertheless |
| achievement | achievement | 0.8 | remarkably |
| loss | achievement | 0.3 | however |
| information | information | 0.5 | moreover |
| failure | recognition | 0.3 | however |
| recognition | information | 0.7 | also |

An example of generating the intelligent voice assistant response by combining the combining the preliminary voice assistance response with the emotionally uplifting information, the personalized note, and the connective word is shown below:

Voice Command: "Hey Bixby! What happened in today's cricket match?"
Preliminary voice assistant response R1: Australia beat India by 30 runs with 2 wickets in hand
Sentiment score of R1: 0.3
Emotion Uplifting Information R2: Rohit Sharma created record of highest runs as an opener
Nature of Event of R1: Loss
Nature of event for R2: Achievement
Personalized note: It's time to tweet again
Connective word: Nevertheless
Intelligent voice assistant response: Australia beat India by 30 runs with 2 wickets in hand, Nevertheless, It's time to tweet again, "Rohit Sharma created record of highest runs as an opener".

In a further embodiment of the disclosure, the audio style of the intelligent voice assistant response may also be updated before delivering to the user. In an embodiment of the disclosure, the updating the audio may comprise updating the audio style of the preliminary voice assistant response R1 and the emotionally uplifting information. In an embodiment of the disclosure, a first audio updating unit 422 may update the audio style of the preliminary voice assistant response R1 based on the subjective polarity score. The audio style of the preliminary voice assistant response may be updated by at least one of adding pause after R1, modifying pitch of the audio of R1 and modifying volume of R1. For example—If the person has failed the exam in the preliminary response, the volume can be low and not sharp (low pitch). Then a pause is put and the uplifting response— of another exam scheduled next week is added with higher volume and pitch. In an embodiment of the disclosure, the first audio 424 updating unit may be a prosody engine.

In an embodiment of the disclosure, the audio style of the emotionally uplifting information (R2) may be updated based on the dynamic polarity score (DPS), the nature of the emotionally uplifting information (R2), and the sentiment score (R1TPS). The audio style of the emotionally uplifting information (R2) may be updated by at least one of adding background music to R2, modifying pitch of the audio of R2, modifying volume of R2 and modifying speed of the audio of R2.

To modify the audio style of R2, a second audio updating unit 426 of the system 400 may use FastSpeech2 library and may output sentiment speech waveform for input text i.e., R2. In an embodiment of the disclosure, the second audio updating unit 426 may be a prosody engine. The dynamic polarity score may be determined based on instant user reactions of at least a part of the intelligent voice assistant response. In other words, the audio style of R2 may be updated while delivering the intelligent voice assistant response. While the intelligent voice assistant response is being delivered i.e., text of the intelligent voice assistant response (R'), the user may react to a part of it and that instant user reactions are monitored and corresponding DPS for context of R2 i.e., R' is calculated, as discussed in reference to FIG. 7. If new DPS is almost same as of last instant (difference less than 0.2), the pitch and energy audio parameter values are calculated with new DPS and accordingly further speech is enriched to obtain more positive user instant reactions.

Additionally, if R1TPS<=+0.3, this means that R1 has a negative effect on user. A pause is introduced before enriched response R' delivery, to let the negative information sink in for the user. The pause durations are of 4, 3 and 2 seconds based on R1TPS.

If R1TPS>+0.3, this means that R1 has positive effect on user. A background music related to R1 is added with R' delivery to enhance user's positive emotions. Background sound may be fetched from a music cloud by a background sound engine, using part of speech (POS) tokens of R1, its nature of event and context category C, along with user's personal music preferences. In particular, the background sound engine creates a query to search an appropriate music from cloud based on user preference of music. A user profile tree may contain user music preferences data under the 1st level node "Music". Data may contain information including: Preferred language, genre, artist, subject, listening history as JSON objects. Then, a highlight music trimmer identifies the highlighted part based on frequency and amplitude of the music and trims it accordingly.

In an embodiment of the disclosure, the background music for R1 India finished 48th in the Olympic medal tally in Tokyo, its highest ranking in over four decades with 7 medals—1 gold, 2 silver, 4 bronze may be determined as Chakk de. mp3.

Final emotionally enriched response becomes: [R1 text with updated prosody waveform]+[Pause (if R1<=0.3)]+R' text with updated prosody waveform (audio)+[BG sound (if R1>0.3)] and the enriched i.e., the updated audio is delivered using a delivering unit 428 of the system 400.

This way, the proposed techniques calculate the polarity (subjective and dynamic) of the preliminary voice assistant response and neutralizes the polarity to balance the sentiments with respect to the listener. Thereby, the proposed techniques provide the enriched response by adding styled attributes in its way of presentation for better user experience.

FIG. 4 illustrates a block diagram of a system 400 for generating an intelligent voice assistant response, according to an embodiment of the disclosure. The system 400 may be coupled to a transceiver for receiving a preliminary voice assistant response to a user command.

Referring to FIG. 4, the transceiver has not been shown due to brevity of the specification. The system 400 may further comprise a subjective polarity score determination unit 410 for determining a subjective polarity score of the preliminary voice assistant response. The system 400 may further comprise a dynamic polarity score determination unit 412 for determining a dynamic polarity score indicative of an instant user reaction to the preliminary voice assistant response, once the preliminary voice assistant response is delivered. The system 400 may also comprise a sentiment score determination unit 414 for determining a sentiment score of the preliminary voice assistant response based on the subjective polarity score and the dynamic polarity score, using a first neural network. The system 400 may also comprise an emotionally uplifting information unit 416 for identifying an emotionally uplifting information for the user that is to be combined with the preliminary voice assistant response. The system 400 may also comprise a personalized note generation unit 418 for generating a personalized note to be combined with the preliminary voice assistant response based on the sentiment score and nature of the preliminary voice assistant response, using a second neural network. The system 400 may also comprise a response generation unit 420 for generating the intelligent voice assistant response by combining the preliminary voice assistant response with the emotionally uplifting information and the personalized note. The system 400 may further comprise a prediction unit 422, a first audio updating unit 424, a second audio updating unit 426 and a delivering unit 428, although not shown in the drawings due to brevity of the drawing and specification. In an embodiment of the disclosure, the system 400 may be configured to perform the method as discussed in respect to FIGS. 3, 5, 6A, 6B, and 7.

In an embodiment of the disclosure, the various units 410-428 may be a single processing unit or a number of units, all of which could include multiple computing units. The units 410-428 may be implemented as one or more microprocessors, microcomputers, microcontrollers, digital signal processors, central processing units, state machines, logic circuitries, and/or any devices that manipulate signals based on operational instructions. Among other capabilities, the units 410-428 may be configured to fetch and execute computer-readable instructions and data stored in a memory. The units 410-428 may include one or a plurality of processors. At this time, one or a plurality of processors may be a general-purpose processor, such as a central processing unit (CPU), an application processor (AP), or the like, a graphics-only processing unit, such as a graphics processing unit (GPU), a visual processing unit (VPU), and/or an AI-dedicated processor, such as a neural processing unit (NPU). One or a plurality of processors control the processing of the input data in accordance with a predefined operating rule or artificial intelligence (AI) model stored in the non-volatile memory and the volatile memory. The predefined operating rule or artificial intelligence model is provided through training or learning.

FIGS. 8, 9, 10, 11, 12, 13, 14, and 15 illustrate comparison between the disclosure and the related art, according to various embodiments of the disclosure.

Figure 8:
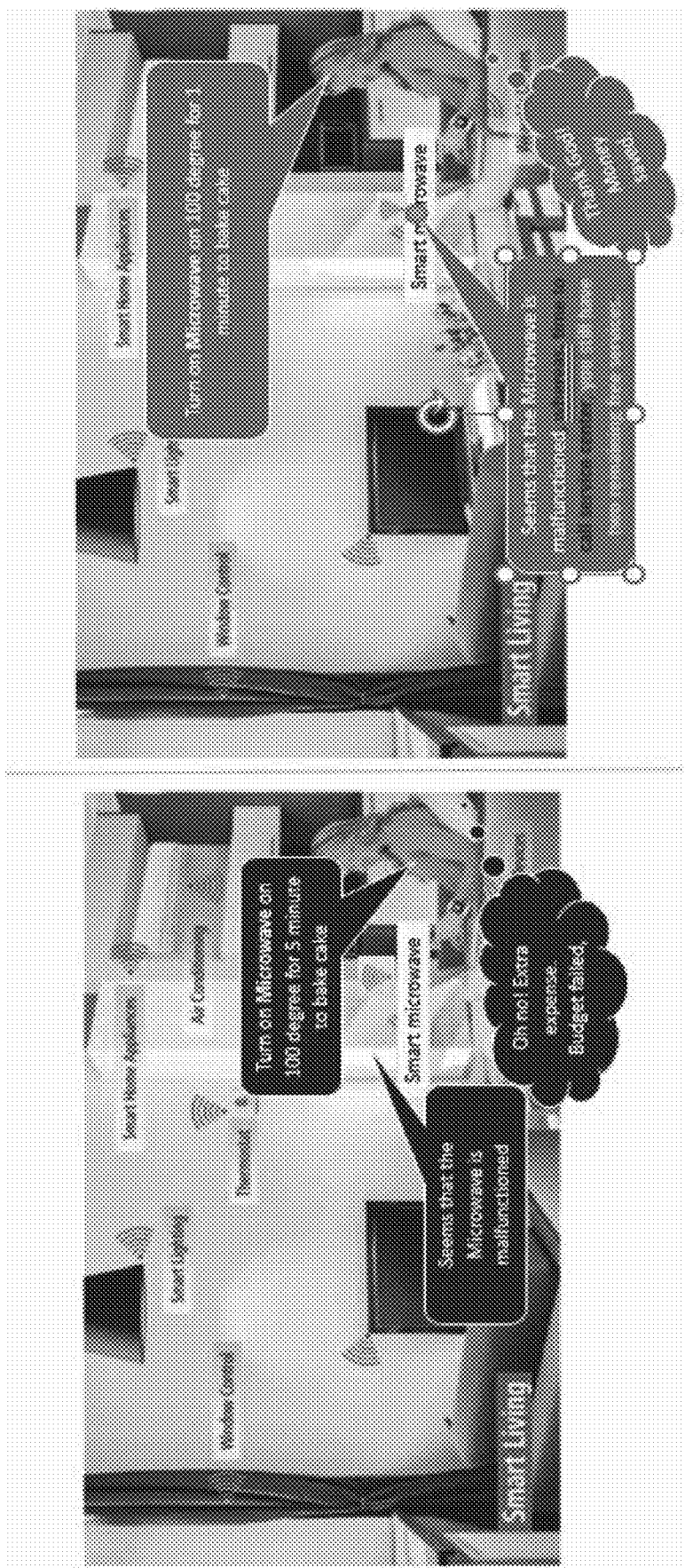
FIGS. 8, 9, 10, 11, 12, 13, 14, and 15 illustrate comparison between the disclosure and the related art, according to various embodiments of the disclosure.
Figure 9:
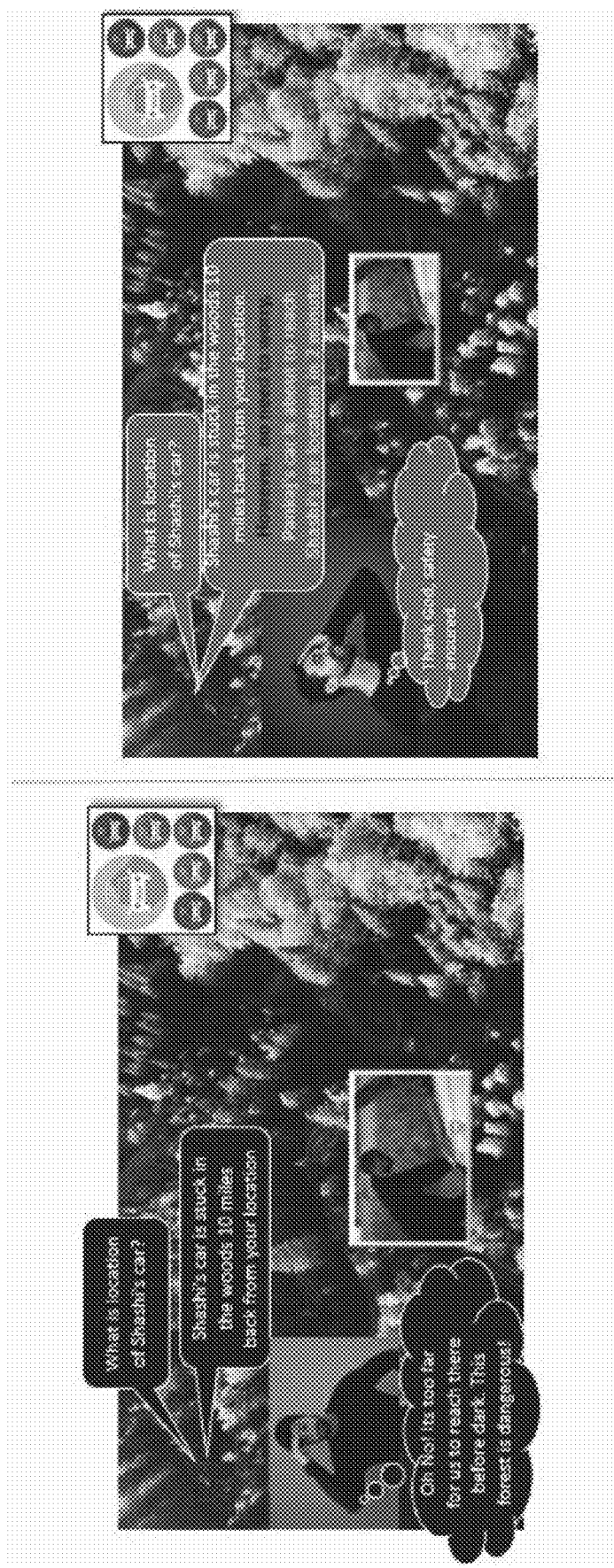
Figure 10:
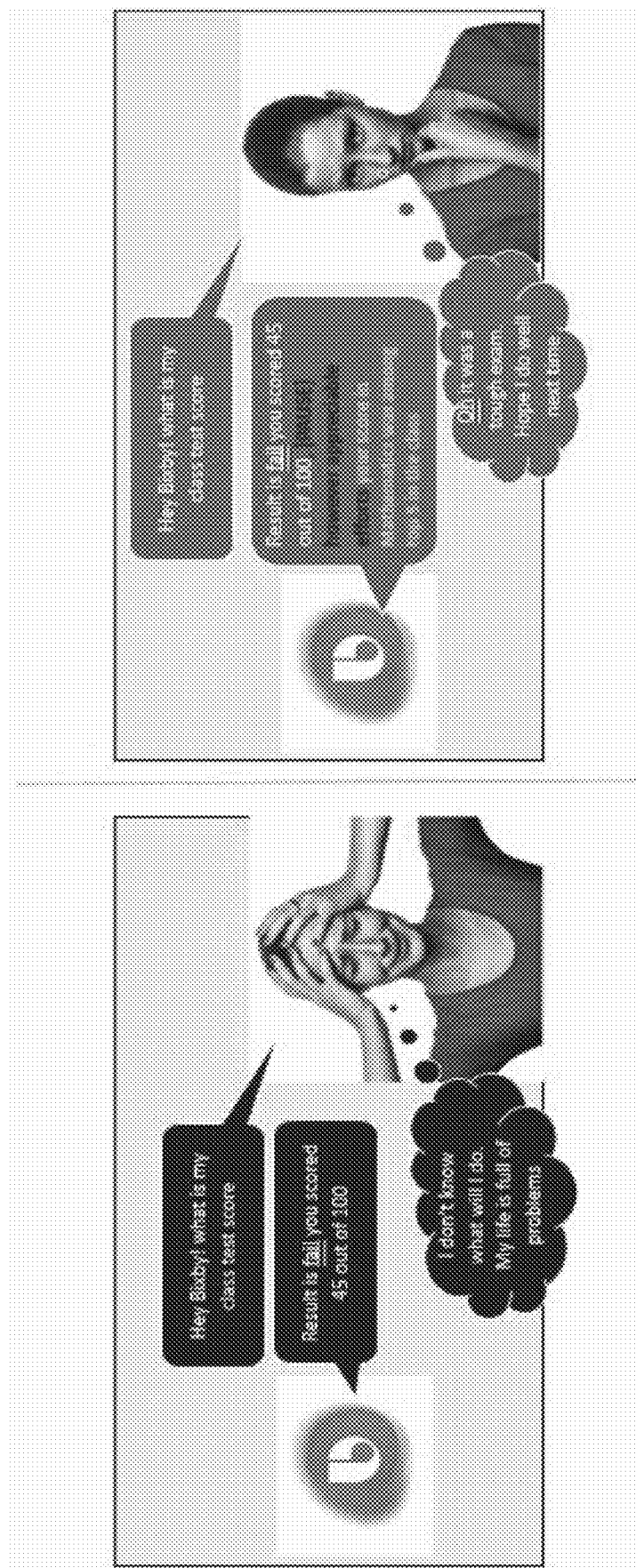
Figure 11:
Figure 12:
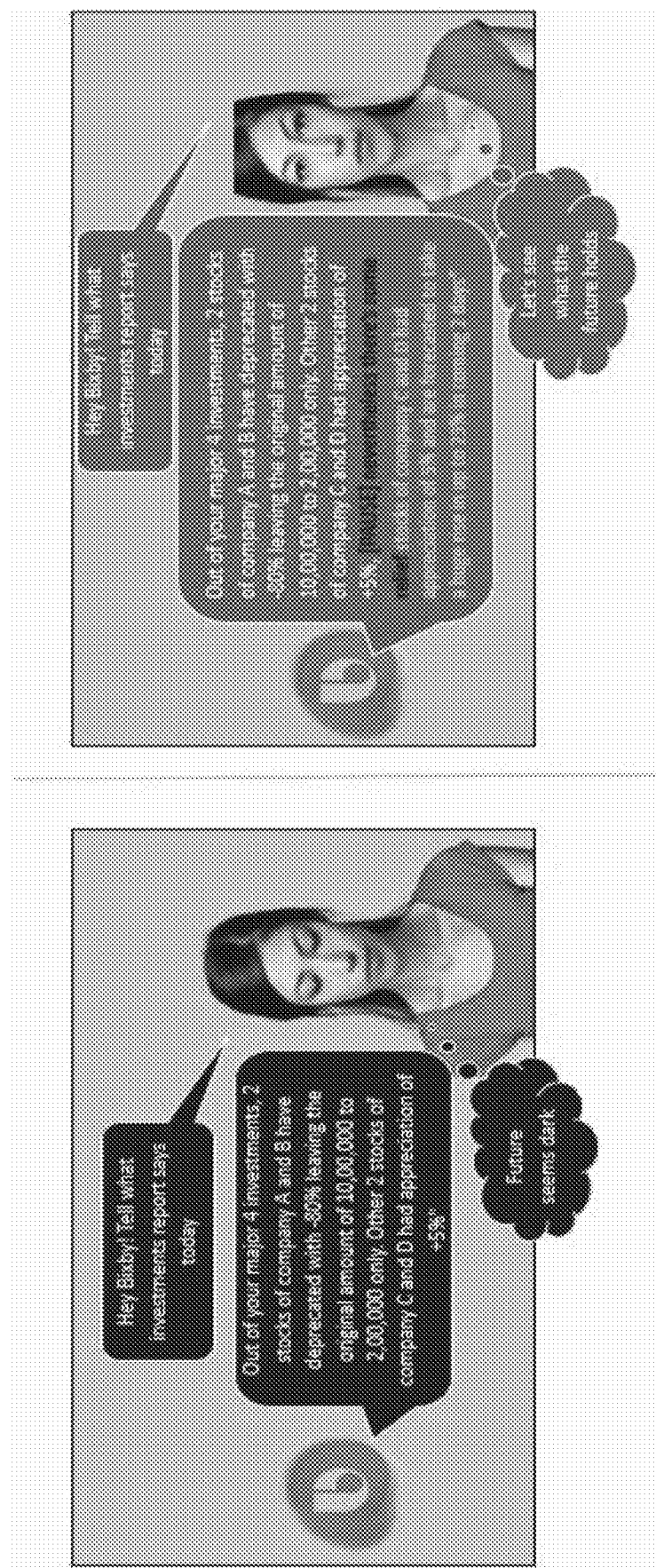
Figure 13:
Figure 14:
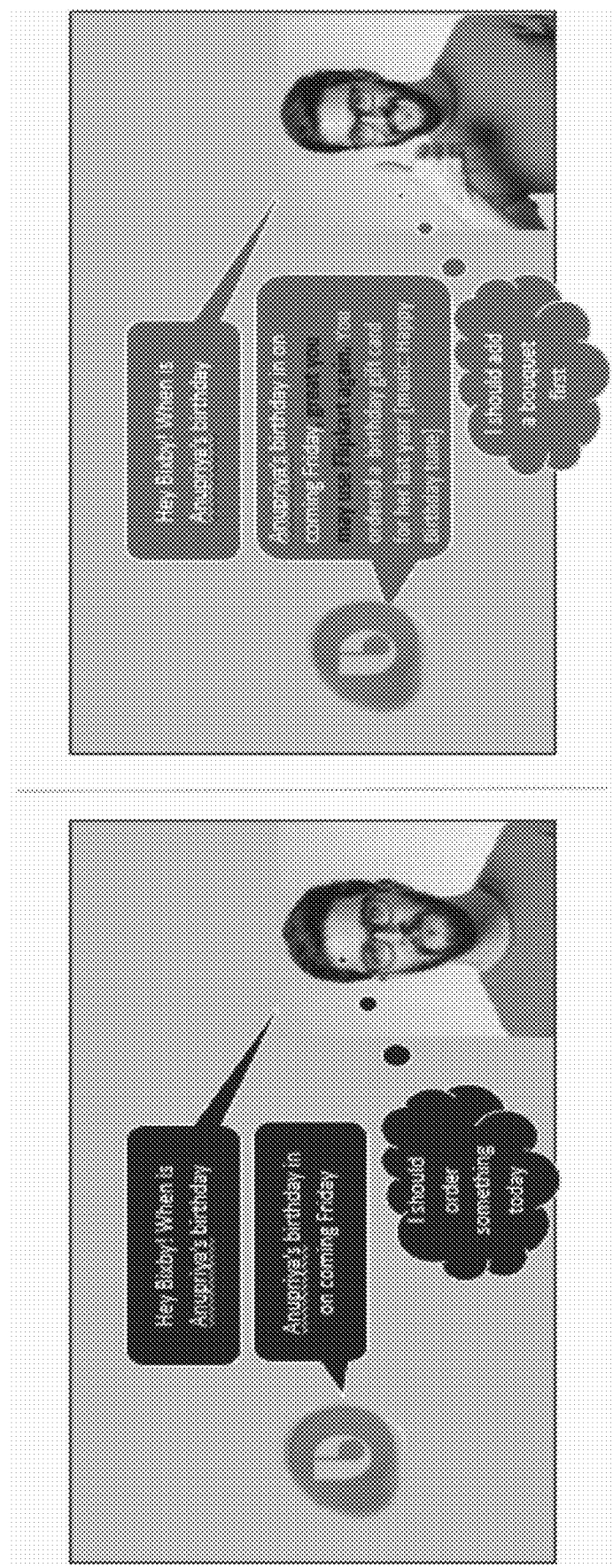
Figure 15:
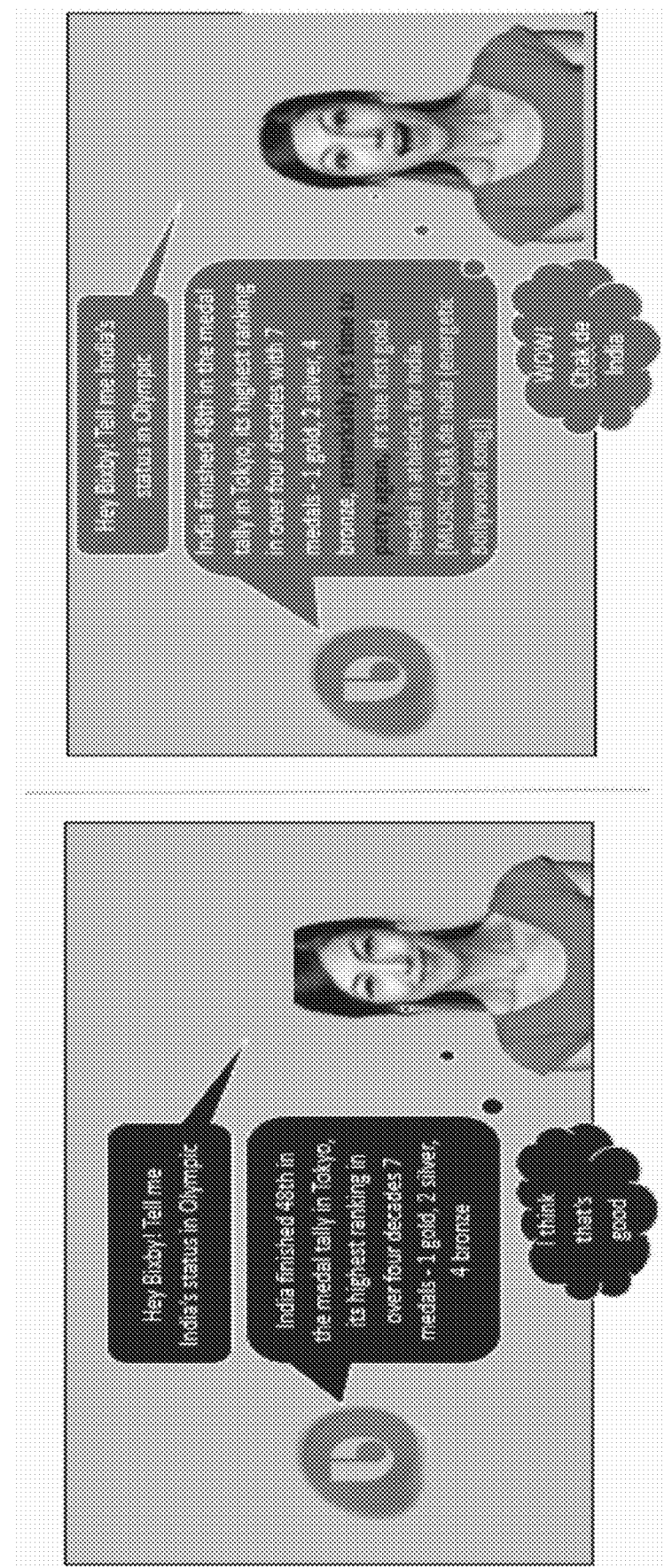

Referring to FIG. 8, the intelligent voice assistant response to a query "Turn on Microwave on 100 degree for 5 minute to bake cake" is Seems that the Microwave is malfunctioned, whereas, time to call service center, you still have two remaining free services. Here, the preliminary voice assistant response i.e., response according to related art is "Seems that the Microwave is malfunctioned", the connected word is "whereas", the personalized note is "time to call service center" and the emotionally uplifting information is "you still have two remaining free services". As evident from FIG. 8, where the original VA response might have resulted in a sad news for a user, the intelligent VA response helps the user in lifting her mood and is more appropriate for the user.

Similarly, FIGS. 9 to 15 also illustrates comparison between the disclosure and the related art, according to various embodiments of the disclosure.

Hence, the disclosed techniques provide an emotionally enriched voice assistant response to the user.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. In addition, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for generating an intelligent voice assistant response, the method comprising:
   receiving a preliminary voice assistant response to a user command;
   determining a subjective polarity score of the preliminary voice assistant response;
   determining a dynamic polarity score indicative of an instant user reaction to the preliminary voice assistant response, once the preliminary voice assistant response is delivered;
   determining a sentiment score of the preliminary voice assistant response based on the subjective polarity score and the dynamic polarity score, using a first neural network;

identifying an emotionally uplifting information for a user that is to be combined with the preliminary voice assistant response;

generating a personalized note to be combined with the preliminary voice assistant response based on the sentiment score and nature of the preliminary voice assistant response, using a second neural network;

predicting a connective word to connect the personalized note with the preliminary voice assistant response, based on the sentiment score, the nature of the preliminary voice assistant response, and nature of the emotionally uplifting information, using a third neural network; and generating the intelligent voice assistant response by combining the preliminary voice assistant response with the emotionally uplifting information, the personalized note, and the connective word, wherein the determining of the subjective polarity score comprises:

monitoring usage history of the user in a context of the preliminary voice assistant response, creating a user data tree based on the usage history, determining frequency and likeliness of the context of the preliminary voice assistant response in respect of the user, and determining the subjective polarity score based on the frequency and the likeliness, wherein the emotionally uplifting information is identified from local or global database based on the context of the preliminary voice assistant response, the sentiment score and context of the user data tree, wherein the method further comprises:

updating an audio style of the preliminary voice assistant response based on the subjective polarity score, updating an audio style of the emotionally uplifting information based on the dynamic polarity score, the sentiment score and the nature of the emotionally uplifting information, prior to generating the intelligent voice assistant response, and delivering the intelligent voice assistant response in the updated audio style of the preliminary voice assistant response, wherein the updating of the audio style of the preliminary voice assistant response comprises:

adding pause after the preliminary voice assistant response, modifying pitch of an audio of the preliminary voice assistant response, and modifying volume of the preliminary voice assistant response, and wherein the updating of the audio style of the emotionally uplifting information comprises:

adding background music to the emotionally uplifting information, modifying pitch of an audio of the emotionally uplifting information, modifying volume of the emotionally uplifting information, and modifying speed of the audio of the emotionally uplifting information.

2. The method of claim 1, wherein the subjective polarity score is indicative of relevance of the preliminary voice assistant response to the user, wherein the sentiment score is indicative of an emotional quotient to be incorporated in the preliminary voice assistance response to the user, and wherein the emotionally uplifting information is identified from the context of the preliminary voice assistant response.

3. The method of claim 1, wherein the dynamic polarity score is determined based on the instant user reaction to at least a part of the intelligent voice assistant response.

4. The method of claim 1, wherein the determining of the dynamic polarity score comprises at least one of:

analyzing instant audio response of the user to the preliminary voice assistant response;

analyzing instant body reaction of the user to the preliminary voice assistant response; or determining presence of another user in proximity of the user at a time of delivering the preliminary voice assistant response.

5. The method of claim 1, wherein the determining of the dynamic polarity score comprises at least one of:

analyzing instant audio response of the user to at least a part of the intelligent voice assistant response;

analyzing instant body reaction of the user to the at least the part of the intelligent voice assistant response; or determining presence of another user in proximity of the user at a time of delivering the at least the part of the intelligent voice assistant response.

6. The method of claim 1, wherein the nature of the preliminary voice assistant response and the emotionally uplifting information is determined as positive, negative or neutral and is determined based on the context of the preliminary voice assistant response and the emotionally uplifting information.

7. The method of claim 1, further comprising:

determining text response from the preliminary voice assistant response;

determining the nature of the preliminary voice assistant response as positive, negative or neutral;

determining the context of the preliminary voice assistant response;

determining relation between the text response and the user as public and personal;

determining relation between the user and surrounding users; and generating the personalized note based on the determined text response, the nature of the preliminary voice assistant response, the sentiment score, the context of the preliminary voice assistant response, the relation between the text response and the user, the relation between the user and the surrounding users and at least one application associated with the context of the preliminary voice assistant response.

8. A system for generating an intelligent voice assistant response, the system comprising:

a subjective polarity score determination unit configured to determine a subjective polarity score of a preliminary voice assistant response received from a transceiver;

a dynamic polarity score determination unit configured to determine a dynamic polarity score indicative of an instant user reaction to the preliminary voice assistant response, once the preliminary voice assistant response is delivered;

a sentiment score determination unit configured to determine a sentiment score of the preliminary voice assistant response based on the subjective polarity score and the dynamic polarity score, using a first neural network;

an emotionally uplifting information unit configured to identify an emotionally uplifting information for a user that is to be combined with the preliminary voice assistant response;
a personalized note generation unit configured to generate a personalized note to be combined with the preliminary voice assistant response based on the sentiment score and nature of the preliminary voice assistant response, using a second neural network;
a prediction unit configured to predict a connective word to connect the personalized note with the preliminary voice assistant response, based on the sentiment score, the nature of the preliminary voice assistant response, and nature of the emotionally uplifting information, using a third neural network; and
a response generation unit configured to generate the intelligent voice assistant response by combining the preliminary voice assistant response with the emotionally uplifting information, the personalized note, and the connective word,
wherein the subjective polarity score determination unit further configured to:
monitor usage history of the user in a context of the preliminary voice assistant response;
create a user data tree based on the usage history;
determine frequency and likeliness of the context of the preliminary voice assistant response in respect of the user; and
determine the subjective polarity score based on the frequency and the likeliness,
wherein the emotionally uplifting information is identified from local or global database based on the context of the preliminary voice assistant response, the sentiment score and context of the user data tree,
wherein the system further comprises:
a first audio updating unit configured to update an audio style of the preliminary voice assistant response based on the subjective polarity score,
a second audio updating unit configured to update an audio style of the emotionally uplifting information based on the dynamic polarity score, the sentiment score and the nature of the emotionally uplifting information, prior to generating the intelligent voice assistant response, and
a delivering unit is further configured to deliver the intelligent voice assistant response in the updated audio style of the preliminary voice assistant response,
wherein the first audio updating unit is further configured to update the audio style of the preliminary voice assistant response by:
adding pause after the preliminary voice assistant response,
modifying pitch of an audio of the preliminary voice assistant response, and
modifying volume of the preliminary voice assistant response, and
wherein the second audio updating unit is further configured to update the audio style of the emotionally uplifting information by:
adding background music to the emotionally uplifting information,
modifying pitch of an audio of the emotionally uplifting information,
modifying volume of the emotionally uplifting information, and
modifying speed of the audio of the emotionally uplifting information.

9. The system of claim 8,
wherein the subjective polarity score is indicative of relevance of the preliminary voice assistant response to the user,
wherein the sentiment score is indicative of an emotional quotient to be incorporated in the preliminary voice assistance response to the user, and
wherein the emotionally uplifting information is identified from the context of the preliminary voice assistant response.

10. The system of claim 8, wherein the dynamic polarity score determination unit is further configured to determine the dynamic polarity score based on the instant user reaction to at least a part of the intelligent voice assistant response.

* * * * *